United States Patent
Myers et al.

(10) Patent No.: US 6,431,319 B1
(45) Date of Patent: Aug. 13, 2002

(54) HEIGHT-ADJUSTABLE EQUIPMENT CART WITH DETACHABLE TABLE

(75) Inventors: Dean Everett Myers; Vincent Ming Lieu; Eugene Van Dyne, all of Wilmington; William Harry Benedict, Jamestown, all of OH (US)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 09/515,135

(22) Filed: Feb. 29, 2000

(51) Int. Cl.[7] .............................. B66F 9/06; B66F 9/00
(52) U.S. Cl. .................. 187/243; 187/244; 187/269; 414/498; 254/10 C; 254/122; 254/126
(58) Field of Search ................................ 187/211, 214, 187/216–220, 240, 242–244, 263, 267, 268, 269, 406, 409, 410, 414; 414/662, 663, 589, 498; 254/3 C, 4 C, 5 C, 6 C, 7 R, 7 C, 9 C, 10 C, 8 C, 122, 126

(56) References Cited

U.S. PATENT DOCUMENTS

| | | |
|---|---|---|
| 1,750,131 A | 3/1930 | Romine |
| 2,451,985 A | 10/1948 | Sides |
| 2,456,817 A | 12/1948 | Davenport |
| 2,650,731 A * | 9/1953 | Adler .......................... 414/498 |
| 2,797,833 A * | 7/1957 | Cash, Jr. .................. 187/243 X |
| 3,259,369 A * | 7/1966 | Gridley ................... 187/243 X |
| 3,336,623 A | 8/1967 | Coates et al. |
| 3,498,628 A | 3/1970 | Ferneau et al. |
| 3,774,929 A | 11/1973 | Stanley |
| 3,971,594 A | 7/1976 | Wirtgen |
| 4,077,535 A * | 3/1978 | Oriol .......................... 414/498 |
| 4,114,854 A * | 9/1978 | Clark ...................... 187/269 X |
| 4,288,195 A * | 9/1981 | Brewer .................... 187/243 X |
| 4,375,248 A * | 3/1983 | Kishi ......................... 187/269 |
| 4,405,116 A * | 9/1983 | Eisenberg ............... 187/269 X |
| 4,604,022 A | 8/1986 | Bourgraf |
| 4,638,610 A * | 1/1987 | Heikkinen .............. 254/122 X |
| 4,655,466 A | 4/1987 | Hanaoka |
| 5,018,931 A * | 5/1991 | Uttley ..................... 414/498 X |
| 5,135,350 A * | 8/1992 | Eelman et al. .......... 414/498 X |
| 5,335,755 A * | 8/1994 | Miller .................... 187/217 X |
| 5,890,737 A * | 4/1999 | Hutka .................... 187/243 X |

FOREIGN PATENT DOCUMENTS

| | | | | |
|---|---|---|---|---|
| FR | 2574773 A | * | 6/1986 | ................ 187/244 |
| GB | 668797 A | * | 3/1952 | ................ 187/243 |
| GB | 1206319 A | * | 9/1970 | ................ 187/232 |
| SU | 901226 A | * | 1/1982 | ................ 187/232 |

* cited by examiner

*Primary Examiner*—Eileen D. Lillis
*Assistant Examiner*—Thuy V. Tran
(74) *Attorney, Agent, or Firm*—Killworth, Gottman, Hagan & Schaeff LLP

(57) ABSTRACT

A height-adjustable cart is provided and includes an undercarriage having a wheeled frame, a double scissor-type lift mechanism and a support frame which is height-adjustable relative to the wheeled frame by the lift mechanism. The wheeled frame includes a pair of extendable rear wheel supports which are each pivotable between a retracted position and an extended position. While in the retracted position, the wheels are in close proximity to the frame, thereby defining a small cart "footprint" for compact storage. While in the extended position, the wheels extend transversely away from the frame, thereby widening the cart "footprint" for stability and for ease of transportation. The height-adjustable cart further includes a detachable table onto which heavy equipment may be loaded. The detachable table includes wheels suitable for carrying the weight of the equipment and for transporting the heavy equipment thereon separate from the undercarriage. The support frame is provided with a pair of rails which receive rollers of the detachable table for rolling the table onto and off from the undercarriage. A lock mechanism is provided in each rail to capture the respective roller therein and to prevent removal of the detachable table from the undercarriage until the locking mechanism has been released.

21 Claims, 3 Drawing Sheets

HEIGHT-ADJUSTABLE EQUIPMENT CART WITH DETACHABLE TABLE

BACKGROUND OF THE INVENTION

The present invention relates to an equipment cart, and more particularly, to a height-adjustable equipment cart with a detachable table for transporting heavy-equipment to an office for an "on-site" demonstration.

There are many height adjustable equipment carts disclosed in the prior art. For example, U.S. Pat. No. 4,655,466 to Hanaoka teaches a height-adjust cart having a wheeled lower frame, a scissor-type lift mechanism and a carrier plate. U.S. Pat. No. 3,498,628 to Ferneau, et al, similarly teaches a cart for conveying and using articles of merchandise, such as a photocopy machine, for "on-site" demonstrations, including a wheeled, collapsible framework having a table mounted thereto for loading of the table/framework into a station wagon.

However, the equipment carts provided in the prior art require that the equipment carried thereon be either lifted separately or secured to a collapsible undercarriage frame in order to load/unload the equipment to and from a transport vehicle or a flat surface. The equipment carts having undercarriage frames that collapse underneath a load typically require a transport vehicle to have a larger amount of storage space in order to accommodate the longer footprint of the cart when collapsed. With some sales personnel having to transport demo equipment in their personal vehicles, accommodating such equipment carts with a long footprint is problematic. Furthermore, with some equipment weighing upwards of 250 lbs., in most cases while demonstrating the equipment, the undercarriage frame must remain supporting the equipment. Typically, such undercarriage frames along with the lift mechanism, are unsightly, and thus may distract from the full presentation of the equipment to a potential customer. Moreover, such heavy equipment are too heavy for one person to load and unload from a transport vehicle, thus with these prior art carts a second person is sometimes required, which adds to costs.

Accordingly, there is a need for a height-adjustable cart having a removable table for transporting an article of heavy equipment loaded thereon in order to assist a person in the loading/unloading of such heavy equipment to and from a transport vehicle or flat surface separate from the undercarriage frame and lift mechanism.

BRIEF SUMMARY OF THE INVENTION

This need is met by the present invention wherein a height-adjustable cart is provided that includes an undercarriage having a wheeled frame, a double scissor-type lift mechanism and a support frame that is height-adjustable relative to the wheeled frame by the lift mechanism. The wheeled frame includes a pair of extendable rear wheel supports, which are each pivotable between a retracted position and an extended position. While in the retracted position, the wheels are in close proximity to the frame, thereby defining a small cart "footprint" for compact storage. While in the extended position, the wheels extend transversely away from the frame, thereby widening the cart "footprint" for stability and for ease of transportation.

The height-adjustable cart further includes a detachable table onto which heavy equipment, for example, a photocopier, may be loaded. The detachable table includes wheels suitable for carrying the weight of the equipment and for transporting the heavy equipment thereon separate from the undercarriage. The support frame is provided with a pair of rails which receive rollers of the detachable table for rolling the table onto and off from the undercarriage. A lock mechanism is provided in each rail to capture the respective roller therein and to prevent removal of the detachable table from the undercarriage until the locking mechanism has been released.

In use, an article of heavy office equipment is loaded onto the detachable table, which is in a locked position on the undercarriage. The entire cart, with the equipment loaded thereon, is wheeled to a transport vehicle, such a station wagon, van, truck or sport utility vehicle. The lift mechanism is then manipulated to adjust the height of the table to a suitable height to permit the table to be detached from the undercarriage and wheeled separately into the transport vehicle. The table is then detached and rolled off by one person into the transport vehicle without lifting either the table or the load. The lift structure is then lowered/compacted and stored in the transport vehicle separately from the table. A reverse procedure is used to remove the table and the equipment thereon from the transport vehicle.

In accordance with one embodiment of the present invention, an equipment cart is provided having a height-adjustable wheeled undercarriage, a detachable table having rollers, which rollers are movable on the height-adjustable wheeled undercarriage to assist a person in moving the detachable table when carrying a load to and from the height adjustable undercarriage, and a locking device releasably securing the detachable table to the height-adjustable wheeled undercarriage.

In accordance with another embodiment of the present invention, a height-adjustable equipment cart is provided, comprising a detachable table having rollers and an undercarriage including a wheeled frame, a double scissor-type lift mechanism, and a support frame having a pair of support rails and a locking device. The support frame is height-adjustable relative to the wheeled frame by the lift mechanism functionally mounted there between. The pair of support rails receive the rollers of the detachable table, and the locking device releasably secures the detachable table to the undercarriage.

Accordingly, it is an object of the present invention to provide a height-adjustable cart having a removable table for transporting an article of heavy equipment loaded thereon in order to assist a person in the loading/unloading of the heavy equipment to and from a transport vehicle or flat surface separate from the undercarriage frame and lift mechanism.

Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
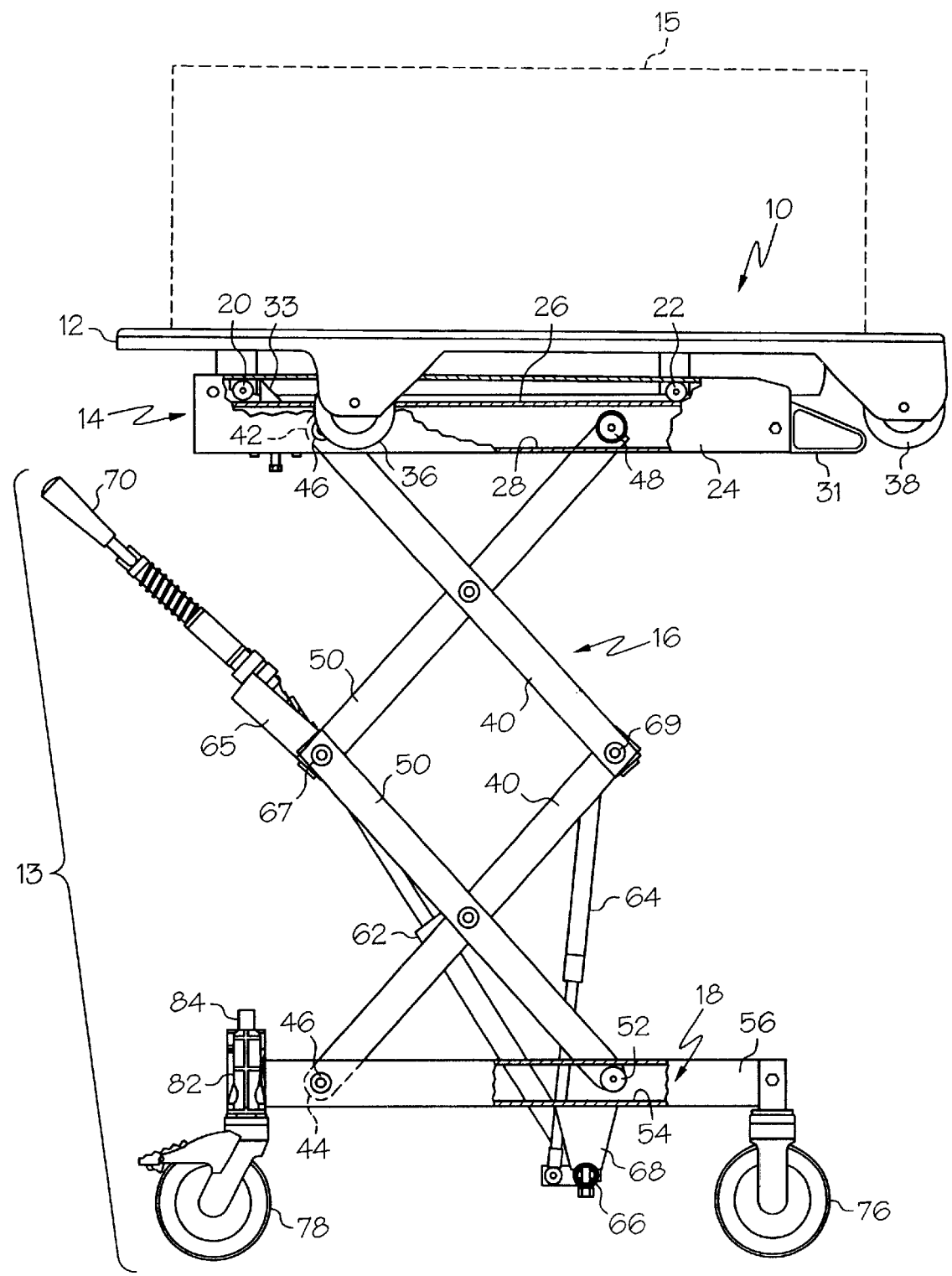
FIG. 1 is a side view, in partial section, of an embodiment of the present invention.

Referring to the drawings cart 10, as illustrated in FIG. 1, includes a generally flat, detachable table 12 used to transport equipment placed thereon, and an undercarriage 13 comprised of a support frame 14, a double scissor-type lift mechanism 16, and a wheeled base frame 18. The support frame 14 is height-adjustable relative to the wheeled base frame 18 by the lift mechanism 16, which is functionally mounted there between. It is contemplated that this cart can be particularly effective in the merchandise trades, for example, for demonstrating heavy articles of merchandise and for transporting the heavy articles of merchandise in a transport vehicle of the demonstrator. Therefore, it is desirable that the detachable table 12 is height adjustable from 17 to 40 inches, have dimensions of about 40 inches by 24 inches, and that the undercarriage 13 weigh under about 40 lbs. Thus, the undercarriage 13 is preferably made of aluminum, and alternatively plastic, steel, or a combination thereof, so that it may be handled by one person, support a load 15 at least about 250 pound, and when compacted, fit into a space 32 inches long by 17 inches wide by 14½ inches high. It is to be appreciated that in using the cart 10 of the present invention, only one person is required to load/unload both the undercarriage 13 and the transported heavy equipment on table 12 to and from a transport vehicle without having to lift the table and the load 15. A more specific detailed discussion now follows regarding the construction of the cart 10.

Figure 2:
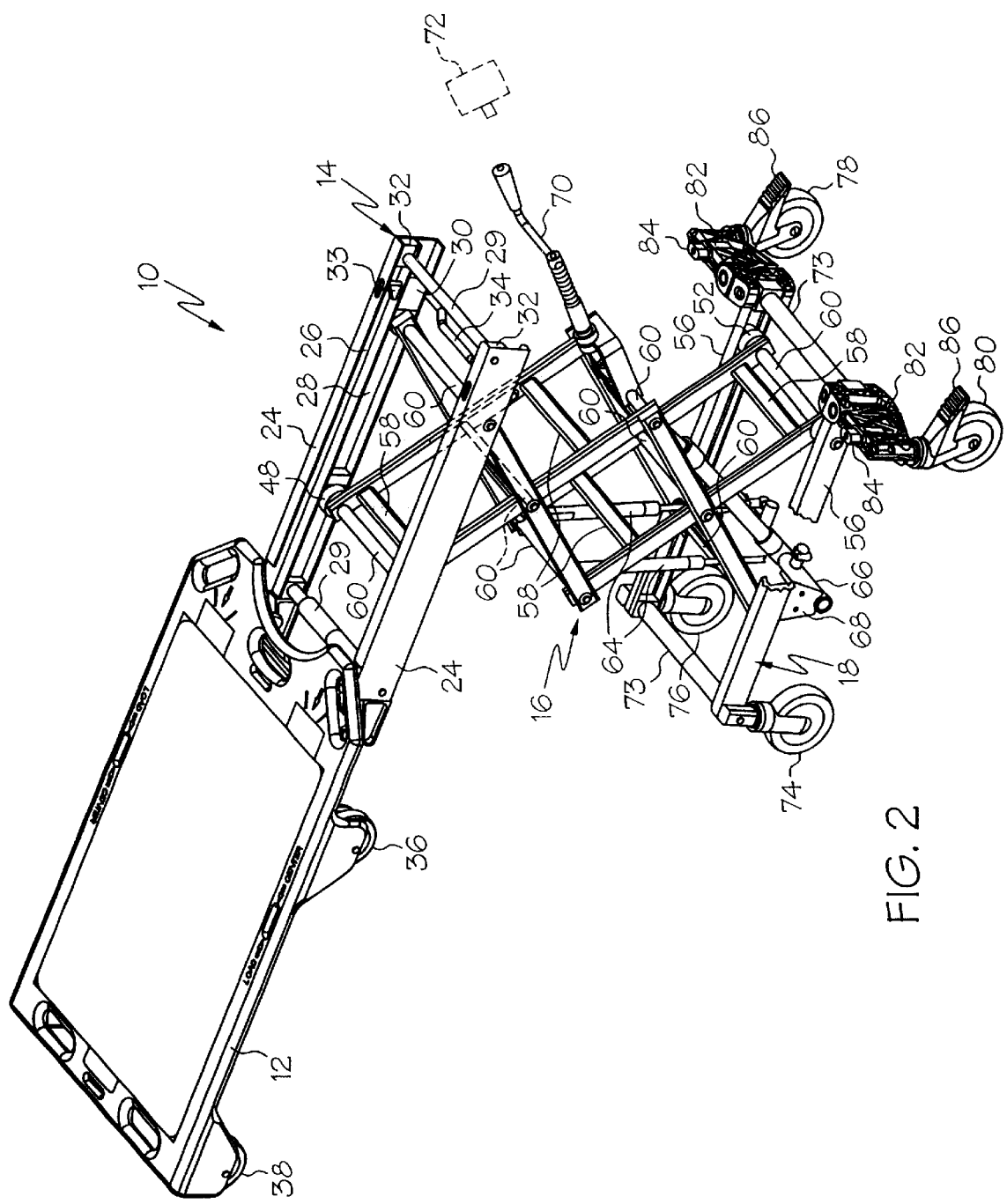
FIG. 2 is a perspective view of an embodiment of the present invention with a removable table removed and an undercarriage height-adjusted with a part-cut away.

Viewing the drawings, as further illustrated by FIG. 1, in the cut-away portion of support frame 14, the detachable table 12 is support by a first and second pair of rollers 20 and 22, respectively, of which only one each of the pairs of rollers is shown for ease of illustration. The rollers are the same on the opposite side of detachable table 12. The pairs of rollers 20 and 22 engage and roll within a pair of opposed support rails 24, which form the longitudinal side of the support frame 14. FIG. 2 shows that the support rails 24 are E-shaped, and each have an upper track 26 and a lower track 28. Completing the support frame 14 are struts 29, one of each of which is mounted between the oppositely facing ends of the support rails 24.

To facilitate the rolling of the detachable table 12 onto and off the cart 10, the pairs of support rollers 20 and 22 roll on the upper track 26 of the support rails 24. A pair of ramps 31 helps guide the rollers 20 and 22 onto and from the upper tracks 26. It is to be appreciated that with the rollers 20 and 22 guided by the upper track 26, the detachable table 12 is self-aligned to the undercarriage 13.

A pair of self-locking mechanisms 30, integral with the pair of support rails 24, prevents the removal of the detachable table 12 from the undercarriage 13 by trapping the first pairs of rollers 20 between a pair of stops 32 and the self-locking mechanisms 30, thereby by defining a locking position. As illustrated in FIG. 1, the first pair of rollers 20 is trapped by rolling over an angled plunger 33 of each self-locking mechanism 30. The angled plunger 33 is spring-biased so that as rollers 20 rolls over it, the plunger recedes into its housing. Once rollers 20 pass the plunger 33, it springs up trapping the rollers 20.

As shown in FIG. 2, a release bar 34 is provided to re-house the angled plungers 33 of the pair of locking mechanisms 30, thereby releasing the entrapped first pair of rollers 20 from the locked position, and allowing detachable table 12 to roll freely upon the upper tracks 26 and from the undercarriage 13. The locking mechanisms 30 and the release bar 34 together form a locking device that releasably secures the detachable table 12 to the undercarriage 13.

When separate from the undercarriage 13, the removable detachable table 12 further includes two pairs of wheels 36 and 38 that are suitable for carrying the weight of the heavy equipment, for example, a photocopier, and for transporting the heavy equipment thereon. It is to be appreciated that when the table 12 is detached from the undercarriage 13, the wheels 36 and 38 take up the load 15 from the pairs of rollers 20 and 22.

As illustrated in FIG. 1, the lift mechanism 16 has multiple sets of linked arms that are pivotally mounted at their pivot points forming a double scissor-type mechanism. A first set of linked arms 40 is pivotally mounted to both the frame member 14 and the base frame 18 at opposed ends 42 and 44 by pivot pins 46. Track rollers 48 are provided on each upper end of a second set of linked arms 50, and each track roller is constrained to roll within one of the lower tracks 28 provided by the pair of support rails 24. Base rollers 52 are provided on each lower end of the second set of linked arms 50 and each base roller is constrained to roll within one of a pair of base tracks 54 which are formed on opposite lateral sides 56 of the base frame 18. The linked arms 40 and 50 are connected by brace members 58 to prevent side sway. The linked arms 40 and 50 are also laterally supported at their pivot points by connecting bars 60, which prevent movement of the linked arms in a sideways direction.

Figure 3:
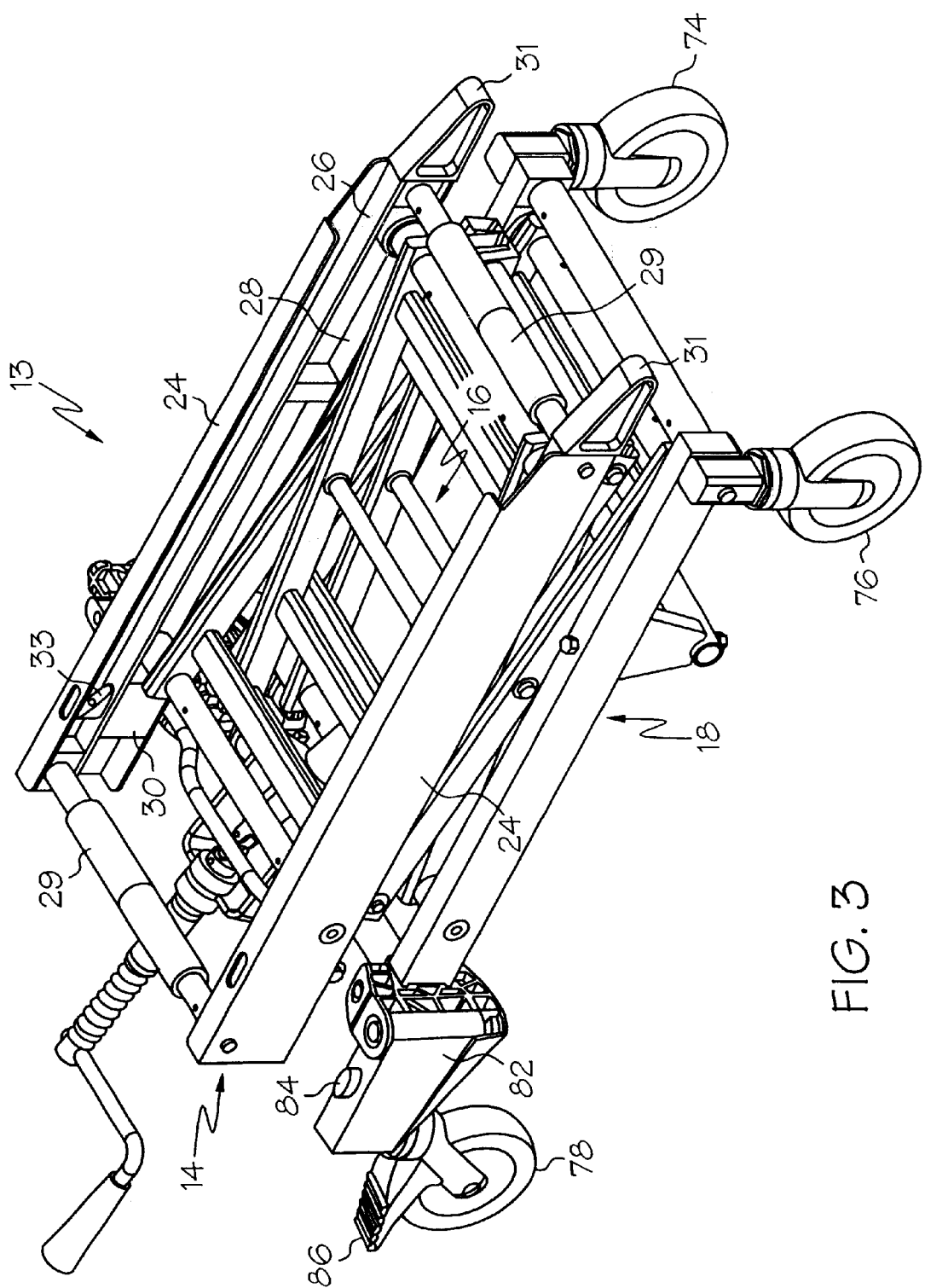
FIG. 3 is a perspective view the undercarriage of the present invention compacted for storage.

To accomplish the raising and lowering of the cart 10, the lift mechanism 16 further includes a screw mechanism 62 and a pair of shocks 64. The screw mechanism has oppositely directed threaded portions, and at an upper end is connected to the connecting bar 60, via a U bracket 65, at a central pivot point 67 of linked arms 40. The shocks 64 are conventional and are pre-loaded or spring biased for assisting the lifting of the load 15 carried on the detachable table 12 at lower height elevations. To the connecting bar 60 provided at a central pivot point 69 of the linked arms 50, each upper end of the pair of shocks 64 is rotatably connected. As shown by the cut-away portion of FIG. 2, both the screw mechanism 62 and the pair of shocks 64 at their lower ends are rotatably mounted to a crossbar 66. The crossbar 66 is connected at its end by a pair of braces 68 such that one of each is affixed to a respective one of the undersides of lateral sides 56 of base frame 18. The braces 68 are affixed to the lateral sides 56 at a location so as to allow the screw mechanism 62 and the pair of shocks 64 to rotate about crossbar 66 and the central pivot points 67 and 69 to lay down within the base frame 18 when the undercarriage 13 is compacted as illustrated in FIG. 3. Either a hand operated crank 70, or a reversible electric motor 72 coupled to the screw mechanism 62 can be used to drive the screw mechanism and the lift mechanism 16.

Viewing FIG. 2, completing the base frame 18 are a pair of struts 73, one of each of which is mounted between the oppositely facing ends or corners of the lateral sides 56. Additionally, rotatably attached to the bottom of base frame 18, adjacent four corners thereof, are four caster wheels 74, 76, 78, and 80. Two of the caster wheels, such as wheels 78 and 80, are each mounted to one of a pair of extendable wheel supports 82. The pair of extendable wheel supports 82 are each pivotable between a retracted position and an extended position. While in the retracted position (as shown in FIG. 3), the wheels 78 and 80 are in close proximity to the base frame 18, thereby defining a small cart "footprint" for compact storage. While in the extended position (as shown in FIG. 2), the wheels 78 and 80 extend transversely away from the base frame 18, thereby widening the cart "footprint" for stability and for ease of transportation. The wheels 74 and 76 are provided directly below the corners of the base frame 18 for better steerability.

In the extended position, shown in FIG. 2, the extendable wheel supports 82 lock in place for stability of the cart during use. To unlock the wheel supports 82, allowing them to move to the retracted position as shown in FIG. 3, a release button 84 on each of the wheel supports 82 is provided. The release button 84 is spring-biased and sized to be preferably activated with a foot of an operator. The release button 84 when activated allows the associated wheel support 82 to be pivoted from the extended position to the retracted position. Further provided on each of the wheels 78 and 80, and rotatably attached to the wheel supports 82, is a wheel lock 86, which when depressed by the operator prevents the associated wheel from moving.

In use, an article of heavy office equipment is loaded onto the detachable table 12, which is in the locked position on the undercarriage 13. The entire cart 10, with the equipment loaded thereon, is wheeled to a transport vehicle, such a station wagon, van, truck or sport utility vehicle. The lift mechanism 16 is then manipulated to adjust the height of the detachable table 12 to a suitable height to permit the detachable table 12 to be released from the undercarriage 13 and wheeled separately into the cargo area of the transport vehicle. The undercarriage 13 is compacted and then stored in the transport vehicle separated from the detachable table 12. A reverse procedure is used to remove the detachable table 12 from the transport vehicle. Accordingly, the cart 10 allows the detachable table 12 to be transferred to and from both the undercarriage 13 and a vehicle by only a single operator and without any lifting.

Having described the invention in detail and by reference to preferred embodiments thereof, it will be apparent that modifications and variations are possible without departing from the scope of the invention defined in the appended claims.

What is claimed is:

1. An equipment cart for transporting a load, comprising:
    a height-adjustable wheeled undercarriage;
    a detachable table having rollers and wheels, said rollers are movable on said height-adjustable wheeled undercarriage to assist in moving said detachable table onto and from said height adjustable undercarriage without lifting by supporting the load, and said wheels are adapted to take up the load from the rollers when said detachable table is detached from said undercarriage; and
    a locking device releasably securing said detachable table to said height-adjustable wheeled undercarriage.

2. An equipment cart as set forth in claim 1, wherein said equipment cart is height-adjustable by a device selected from the group consisting of a hand operated crank, and a reversible electric motor.

3. An equipment cart as set forth in claim 1, wherein said height-adjustable wheeled undercarriage includes a wheeled frame, said wheeled frame having a pair of extendable rear wheel supports, which are each pivotable between a retracted position and an extended position.

4. An equipment cart as set forth in claim 1, wherein said height-adjustable wheeled undercarriage has a double scissor-type lift mechanism for adjusting the height of said equipment cart.

5. An equipment cart as set forth in claim 4, wherein said height-adjustable wheeled undercarriage includes a wheel base with a crossbar; and said double scissor-type lift mechanism includes a plurality of connecting bars, a pair of linked arms each with a central pivot point, with said pair of linked arms are connected together by one of said plurality of connecting bar at each said central pivot point, a screw mechanism having oppositely directed threaded portions for operating said pair of linked arms, and a pair of shocks, wherein said screw mechanism and said pair of shocks are rotatably mounted between said crossbar and separately to said one of said plurality of connecting bars at each said central pivot point.

6. An equipment cart as set forth in claim 5 further including a plurality of braces connected between said pair of linked arms for lateral support of said double scissor-type lift mechanism.

7. An equipment cart as set forth in claim 4, wherein said height-adjustable wheeled undercarriage further includes a wheeled base and a support frame which support said rollers of said detachable table, said support frame being height-adjustable relative to said wheeled base frame by said double scissor-type lift mechanism functionally mounted there between.

8. An equipment cart as set forth in claim 1, wherein said height-adjustable wheeled undercarriage includes a support frame having a pair of rails which receive said rollers of said detachable table for rolling said table onto and off said undercarriage.

9. An equipment cart as set forth in claim 8, wherein said locking device is provided on said support frame.

10. An equipment cart as set forth in claim 9, wherein said locking device includes a pair of locking mechanisms and a release bar, wherein said release bar is both operable with and interconnected between said pair of locking mechanisms, and one each of said pair of locking mechanisms is integral with one each of said pair of rails.

11. An equipment cart as set forth in claim 10, wherein said rollers of said detachable table are a first and second pair of rollers, said pair of rails of said support frame include a pair of stops, and said locking device prevents the removal of said detachable table from said height-adjustable undercarriage by trapping said first pair of rollers between said pair of stops and said locking mechanisms, thereby by defining a locking position.

12. A height-adjustable equipment cart for transporting a load, comprising:
    a detachable table having rollers and wheels; and
    an undercarriage including:
        a wheeled frame;
        a double scissor-type lift mechanism; and
        a support frame having at least one support rail and a locking device, said support frame being height-adjustable relative to said wheeled frame by said lift mechanism functionally mounted there between, said at least one support rail is adapted to support said rollers when said detachable table is rolled onto or from said undercarriage such that said rollers support the load, said wheels are adapted to take up the load from said rollers when said detachable table is detached from said undercarriage, and said locking device is adapted to secure releasably said detachable table to said undercarriage.

13. An equipment cart as set forth in claim 12, wherein said lift mechanism is raised and lowered by a device selected from the group consisting of a hand operated crank, and a reversible electric motor.

14. An equipment cart as set forth in claim 12, wherein said wheeled frame includes a pair of extendable rear wheel supports supporting a pair of wheels, which are each pivotable between a retracted position and an extended position, and a wheel lock provided on each of said pair of wheels.

15. An equipment cart as set forth in claim 12, wherein said at least one support rail is a pair of support rails, and said locking device includes a pair of locking mechanisms and a release bar, wherein said release bar is both operable with and interconnected between said pair of locking mechanisms, and one each of said pair of locking mechanisms is integral with one each of said pair of support rails.

16. An equipment cart as set forth in claim 15, wherein said rollers of said detachable table are a first and second pair of rollers, said pair of support rails include a pair of stops, and said locking device prevents the removal of said detachable table from said height-adjustable undercarriage by trapping said first pair of rollers between said pair of stops and said locking mechanisms, thereby by defining a locking position.

17. An equipment cart as set forth in claim 12, wherein said undercarriage includes a wheel base with a crossbar; and said double scissor-type lift mechanism includes a pair of linked arms each with a central pivot-point, a screw mechanism having oppositely directed threaded portions for operating said pair of linked arms, and a pair of shocks; wherein said double scissor-type lift mechanism includes a plurality of connecting bars, said pair of linked arms are connected together by one of said plurality of connecting bars at each said central pivot point, and said screw mechanism and said pair of shocks are rotatably mounted between said crossbar and separately to said one of said plurality of connecting bars at each said central pivot.

18. An equipment cart as set forth in claim 17, wherein said double scissor-type lift mechanism has a plurality of braces connected between said pair of linked arms for lateral support of said double scissor-type lift mechanism.

19. An equipment cart for transporting a load, comprising:

an undercarriage having a wheeled base frame, a support frame, and a lift mechanism functionally mounted between said wheeled base frame and said support frame to adjust the height of the support frame relative to the wheeled base frame;

a detachable table having wheels;

a locking device adapted to releasably secure said detachable table to said support frame of said undercarriage; and rollers adapted to support the load without lifting when moving said detachable table onto and from said height adjustable undercarriage, and said wheel adapted to take up the load from said rollers when said detachable table is detached from said undercarriage.

20. The equipment cart as recited by claim 19, further comprising at least one support rail adapted to permit said rollers to roll thereon and guide said detachable table into self-alignment with the undercarriage.

21. The equipment cart as recited by claim 19, wherein said wheeled base frame includes a pair of rear supports mounting wheels and each said rear support is positionable in close proximity to said base frame for compact storage or transversely away from said base frame for added stability to said undercarriage.

* * * * *